Dec. 14, 1948.  C. G. DUNN  2,456,461
MAGNETIC CORE
Filed Jan. 18, 1947  3 Sheets—Sheet 1
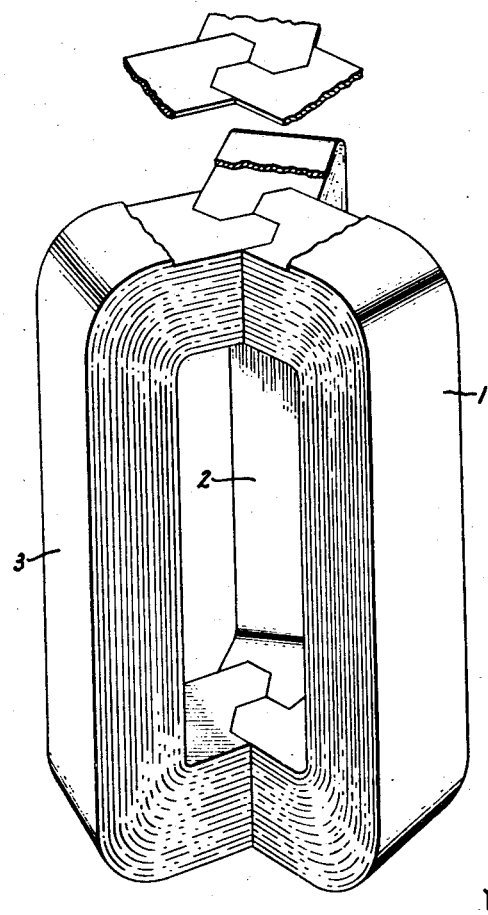
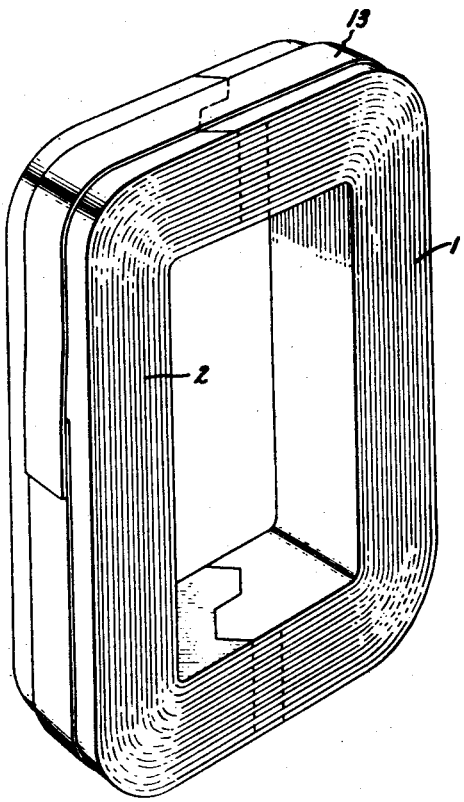
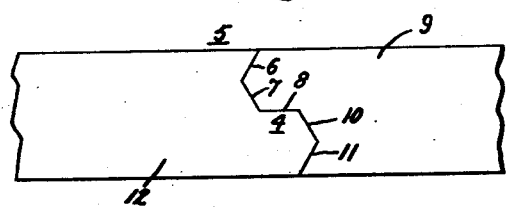
Inventor:
Cecil G. Dunn,
by Ernest C. Britton
His Attorney.

Dec. 14, 1948.  C. G. DUNN  2,456,461
MAGNETIC CORE

Filed Jan. 18, 1947  3 Sheets-Sheet 2

Inventor:
Cecil G. Dunn,
by Ernest C. Britton
His Attorney.

Dec. 14, 1948.           C. G. DUNN            2,456,461
                         MAGNETIC CORE

Filed Jan. 18, 1947                    3 Sheets-Sheet 3

Inventor:
Cecil G. Dunn,
by Ernest C. Britton
His Attorney.

Patented Dec. 14, 1948

2,456,461

UNITED STATES PATENT OFFICE 2,456,461

MAGNETIC CORE

Cecil G. Dunn, Pittsfield, Mass., assignor to General Electric Company, a corporation of New York Application January 18, 1947, Serial No. 722,843

9 Claims. (Cl. 175—356)

This invention relates to magnetic cores and more particularly to improvements in three phase, bent lamination type magnetic cores.

The term "bent lamination" is used in contradistinction to the old flat-stacked lamination type core. It is characterized by forming the core by bending its laminations. One way of bending the laminations is to wind the core from a relatively long strip of magnetic material. Such wound cores are sometimes subsequently cut at one or more places for facilitating their assembly with a conductive coil. Another way is to cut the laminations to the proper length from such a strip and then bend them to shape, usually after assembling them into one or more packets of desired size. In either case, the laminations are usually flatwise bent, that is the curvature is of the lengthwise dimension only. One of the problems connected with bent lamination type cores has been the economical production of a three phase core and this problem is centered around the joints of such a core.

In accordance with this invention, there is provided a three phase bent lamination core having three U-shaped members whose ends are brought together by novel and simple butt and lap joints. The core is of such shape that it can be economically used in transformer tanks of circular cross section.

An object of the invention is to provide a new and and improved magnetic core for induction apparatus.

Another object of the invention is to provide a new and improved three phase joint for magnetic cores.

A further object of the invention is to provide a new and improved way of joining three generally U-shaped, bent lamination magnetic members to form a unitary three phase core.

The invention will be better understood from the following description taken in connection with the accompanying drawing and its scope will be pointed out in the appended claims.

Figure 4:
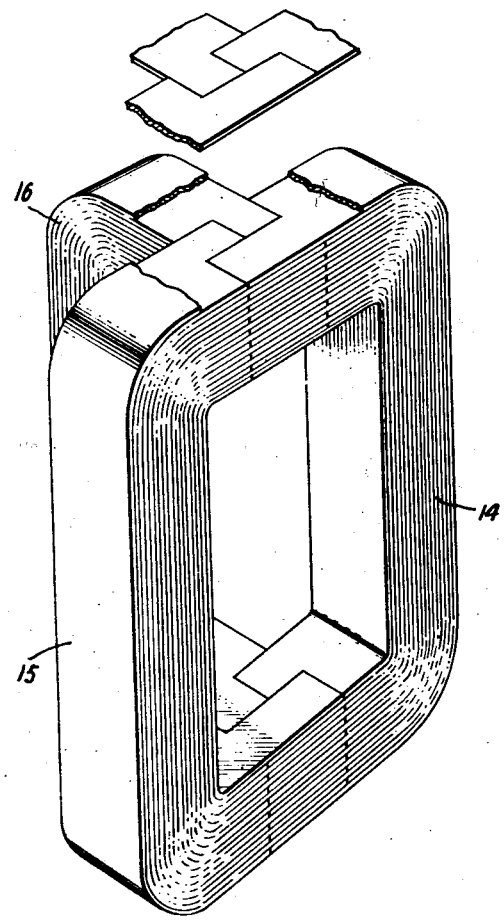
Figure 7:
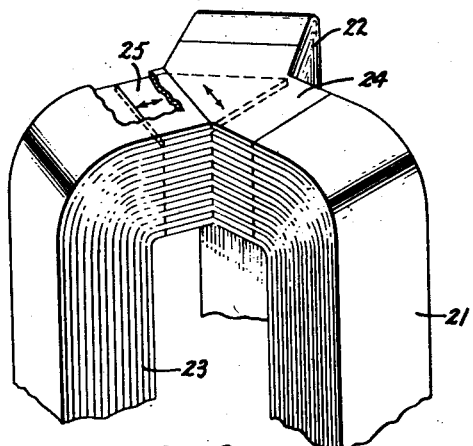
Figure 8:
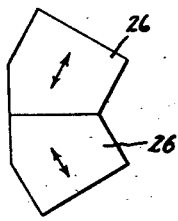
Figure 5:
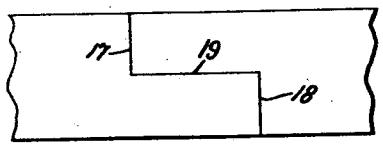
Figure 9:
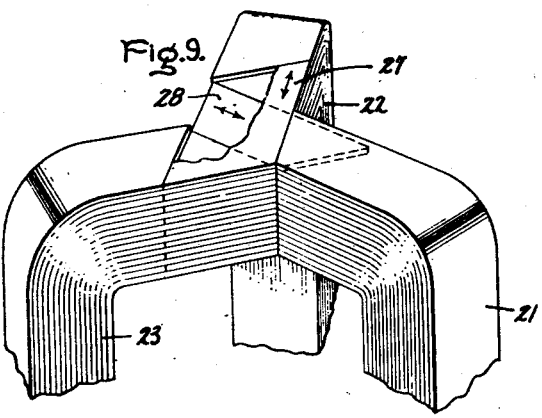
Figure 6:
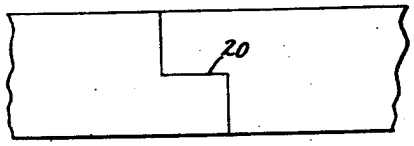
Figure 10:
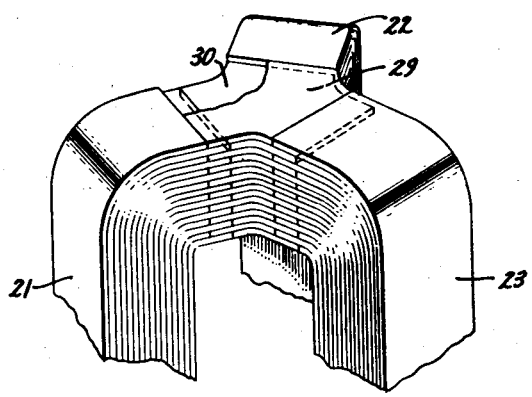
Figure 11:
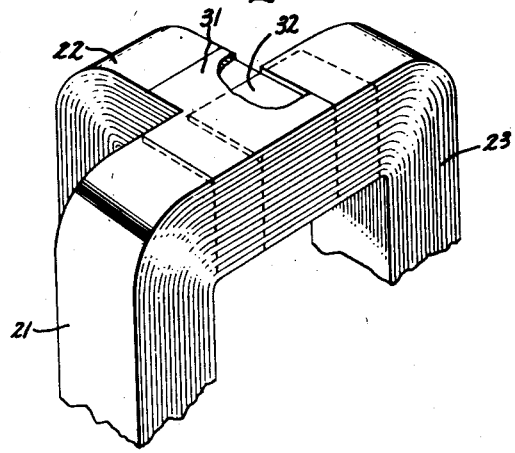
Figure 12:
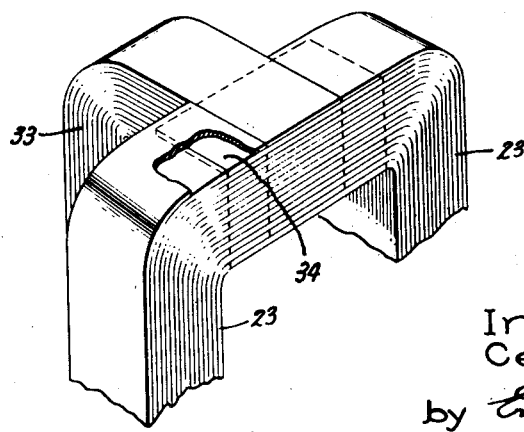

In the drawing Fig. 1 is a partly broken away perspective view of an embodiment of the invention; Fig. 2 is a plan view of the shape of the cut in the strip of magnetic material which is employed in making the core shown in Fig. 1; Fig. 3 is a perspective view showing how two of the U-shaped members used in Fig. 1 may be combined for annealing purposes; Fig. 4 is a partly broken away perspective view of a modified core construction having a T-shaped yoke as contrasted with the Y-shaped yoke shown in Fig. 1; Figs. 5 and 6 show the two different kinds of cuts across the magnetic strip which are employed in making the core shown in Fig. 4; Fig. 7 shows a modified type of Y yoke core in which the ends of the U-shaped members are square cut and additional angular cut magnetic inserts are employed; Fig. 8 shows a modified form of magnetic inserts suitable for use in the core shown in Fig. 7; Fig. 9 shows another modification of a Y yoke core having the ends of the U-shaped members bias cut and employing magnetic inserts therebetween; Fig. 10 is a modification of Fig. 7, and Figs. 11 and 12 are modifications of Fig. 4.

Referring now to the drawings, and more particularly to Fig. 1, the core is shown as comprising there generally U-shaped members 1, 2 and 3. The straight central portions of these members constitute the three winding legs of the core and the bent over ends of the three members are joined together to form Y-shaped yokes for the core. The joints between the ends of the three U-shaped members are butt and lap joints of a special construction which gives low reluctance and which is formed very economically with no waste of the magnetic material.

The shape of the ends of the laminations in all of the members is indicated in Fig. 2 by the zig zag line 4 across a strip of magnetic material 5. The line or cut 4 is characterized by having five equal length straight edges which have the same included angle of 120° between any two adjacent ones. Furthermore, three of these straight edges 6, 7 and 8 form three sides of an imaginary equilateral hexagon whose center is in lamination 9 whereas the remaining two straight edges 10 and 11 combined with the straight edge 8 form three sides of a similar equilateral hexagon whose center is in lamination 12. The centers of the hexagons are in a line which is perpendicular to the length of the laminations. All the lamination pieces have their ends cut in this fashion and they can all be cut with the same shear or die. However, the laminations forming each U-shaped member 3 are progressively different in length by an amount which is a function of the thickness of the magnetic strip 5 so that when the laminations are bent, their ends all terminate in a surface generally perpendicular to the lengthwise dimension of the laminations.

Alternate laminations are reversed laterally so that the joints overlap each other. This is clearly shown in Fig. 1 where the joint at the top of the outer layer has been lifted up so as to reveal the joint between the three lamination pieces in the next uppermost layer. The core of Fig. 1 has been shown as having an even number of laminations so that the joints of the inner layer of the core at the bottom correspond in appearance with the joints at the top of the outer layer.

The U-shaped parts 1, 2 and 3 are duplicates of each other and they can be advantageously made in pairs. For example, a flexible band 13 can be provided which has an inside circumference equal to the sum of the length of the outer laminations of members 1 and 2. Then two laminations can be bent and their ends fitted together so as to be held by the band. Then the two laminations of the next layer can be inserted inside the first ones and so on until the desired thickness is built up, taking care to reverse the laminations in adjacent layers so that contiguous joints will be lapped. By means of a suitably shaped mandrel or other equivalent means, force can be applied to shape the members in the desired way so as to give them the U-shaped configuration shown. In this operation, they are still held together by the band 13 and they can be strain relief annealed in this position. After the annealing operation, band 13 is removed and the members 1 and 2 are separated slightly at the joints enough to allow them to be turned from the position in Fig. 3 in which they are in the same plane or make an angle of 180° with each other to the position shown in Fig. 1 in which their planes make an angle of 120° with each other. Due to the similarity of the end cuts 4, as shown in Fig. 2, they can be tightly fitted together again while making the angle of 120° with each other and this will leave a space which will just accommodate the ends of the third U-shaped member 3, which is identical with members 1 and 2.

The core shown in Fig. 4 has what may be described as a T yoke. This core comprises three laminated generally U-shaped members 14, 15 and 16. The ends of the laminations have what may be described as stepped cuts. Members 14 and 15 are generally similar although the relative positions of the laminations having the different cuts are reversed therein. Thus, considering the stepped end of the outer lamination of the member 15 at the top, which is shown broken away and lifted above the core, this has a cut the details of which are shown in Fig. 5. This may be described as consisting of two steps 17 and 18 separated by a relatively long riser 19. The second layer of the member 14 has a similar cut. This can be the next piece which is cut from the strip of magnetic material by simply turning the piece over so as to make the long projection lie on the proper side. The second layer of the member 15 and all even-numbered layers therein and the first layer of the member 14 and all odd-numbered layers therein have their ends at the top cut as shown in Fig. 6. This differs from the cut in Fig. 5 in that the riser 20 is relatively short and is, in fact, equal in length to one-half the width of the strip. The member 16 is all made up of pieces which are cut with the short riser 20 as shown in Fig. 6. However, the alternate pieces are reversed laterally so that the projections on the ends of the layers fit into the spaces provided therefor between the ends of the members 14 and 15.

In Fig. 7, there are three generally U-shaped members 21, 22 and 23 which have square cut ends of their laminations although alternate laminations are longer than the intermediate laminations so as to form a zig zag or staggered end configuration. As shown in this figure, the outer lamination of the member 23 is a long one at the top of the core whereas the outer lamination of the members 21 and 22 are both short ones at the top of the core. These are joined by a seven sided piece 24 of magnetic material similar to that of which the laminations are composed. This material is preferably high reduction, cold rolled silicon steel which has a pronounced grain orientation and favorable magnetic properties in the direction of rolling and this direction of rolling corresponds with the lengthwise dimension of the laminations. The most favorable magnetic direction of the magnetic insert or piece 24 is indicated by the double-headed arrow thereon. In the second layer there is a differently shaped magnetic insert 25, part of which is shown below the broken away portion of the outer lamination of the member 23. This insert has five sides, two of which come to a point, as shown in dotted lines. The reason for this shape of the piece 25 is that in the second layer the lamination of the member 23 is a short one and the laminations of the members 21 and 22 are long ones. The most favorable magnetic direction of the piece 25 is indicated by the double-headed arrow thereon and it will be seen that this direction is perpendicular to that of the piece 24. In this manner, the average losses in the magnetic inserts are held to a minimum as the flux tends generally to go with the grain of the inserts. The joints at the bottom of the core shown in Fig. 7 have not been illustrated as they are the same as at the top only the relations are preferably reversed in the two layers so that the outer layer at the bottom will have a joint corresponding to the second layer at the top, etc.

The losses in the yoke joints of the core shown in Fig. 7 can be further reduced by using duplicate insert members 26 in place of the member 24. These members 26, when arranged as shown in Fig. 8, have the same overall outline as the member 24. However, their magnetic directions are at a slight angle to each other as indicated in Fig. 8 so that the flux in members 21 and 22 will go with the grain of members 26 instead of slightly across the grain of member 24.

In the modification shown in Fig. 9, the ends of the individual laminations are bias cut on an angle of 30° to the perpendicular or what would be a square cut. Alternate laminations are turned laterally so that the slopes of their ends are opposite and so that the ends of alternate laminations stick out beyond the others. The joints are completed by means of alternately arranged magnetic insert members 27 and 28, the former being parallelogram shaped and the latter being trapezoidally shaped. Thus, in the top layer, as shown in Fig. 9, the parallelogram shaped member 27 makes abutting contact with the bias cut ends of the three top lamination layers of the three U-shaped members. Likewise, immediately below it the isosceles trapezoidally-shaped member 28 makes butting contact with the ends of the second lamination layers in the three U-shaped members. It will be observed that, as in Fig. 7, the top layers consist of two short laminations and one long lamination whereas the second layer consists of two long laminations and one short lamination. This is alternated throughout the joints and at the lower end of the core, the proportion is preferably just the reverse so that what is true for the odd numbered layers in the top joint is true for the even numbered layers in the lower joint and vice versa. The grain direction of the inserts 27 and 28 may be as indicated by the arrows thereon.

In Fig. 10, the U-shaped members 21, 22 and 23 are similar to those shown in Fig. 7 and Y-shaped magnetic inserts 29 are employed. As shown, the upper insert 29 has one long leg which abuts the top lamination layer of member 21 and its other two legs are short and butt up against the long upper lamination layers of the members 22 and 23. In the next layer below the uppermost, the Y-shaped member 30 has a short leg engaging the long lamination of the member 21 and has a similar short leg engaging the long lamination of the member 22 and has a long leg engaging the short lamination of the member 23. These changes are then repeated in the remaining layers.

In the modification shown in Fig. 11, the magnetic members 21, 22 and 23 may be similar to those shown in Figs. 7 and 10. However, they are arranged to form a T-shaped yoke as in Fig. 4 by means of alternate L-shaped inserts 31 and rectangular inserts 32. As shown in Fig. 11, an L-shaped insert 31 is in the top layer and serves to join the long lamination in the outermost part of the member 23 with the short laminations of the outermost parts of members 21 and 22. Beneath this is the rectangular insert 32 which joins the long lamination in the second outermost layers of the members 21 and 22 with the short lamination in the second uppermost layer of member 23. This is alternately repeated throughout the yoke. In the lower part of the core, the parts are preferably reversed so that the odd numbered layers from the outside to the inside will have the rectangular inserts 32 and the even numbered layers will have the L-shaped inserts 31.

In the modification shown in Fig. 12, there are two U-shaped members similar to member 23 in Figs. 7, 10 and 11 combined with a different third member 33 which is characterized by having the longer laminations extending beyond the shorter ones by a distance equal to the width of the laminations in the members 23. As shown in Fig. 12, the outermost or odd numbered layers in all three members are the long layers and the outer layer of member 33 extends between the ends of the outer layers of the members 23. In the even numbered layers, the lamination ends are all short ones. They are joined by rectangular inserts 34. Like the other cores, the corresponding joint at the lower end is essentially the same but preferably the location of the inserts 34 is in the odd numbered layers instead of in the even numbered layers.

While there have been shown and described the particular embodiments of the invention, it will be obvious to those skilled in the art that changes and modifications can be made without departing from the invention and therefore it is aimed in the appended claims to cover all such modifications as fall within the true spirit and scope of the invention.

What I claim as new and desire to secure by Letters Patent of the United States is:

1. A three phase magnetic core comprising, in combination, three generally U-shaped bundles of flatwise curved laminations, corresponding portions of the ends of said laminations being alternately lengthwise offset from each other, at least two of said bundles being substantial duplicates, said three bundles being disposed with their corresponding ends facing each other, and butt and lap joints which include said alternately offset portions interconnecting the corresponding ends of said bundles.

2. A three phase magnetic core comprising, in combination, three generally U-shaped bundles of flatwise curved laminations of magnetic strip material, the ends of all the bundles being similar and being characterized by having the ends of alternate laminations offset from each other, said bundles being arranged with corresponding ends facing each other and with the legs of the bundles forming Y-shaped yokes, and butt and lap joints which include the alternately offset ends of the laminations for completing magnetic circuits between said bundles.

3. A three phase magnetic core comprising, in combination, three generally U-shaped bundles of flatwise curved laminations of magnetic strip material, the ends of said laminations having five equal-length straight edges with equal angles between adjacent edges and between the sides of said strip and the edges respectively adjacent thereto, the center of the five edges being on the center line of the lamination, the two edges between the center edge and one side of the lamination forming with the center edge three sides of a hexagon whose center would lie in the lamination, the two edges between the center edge and the other side of the strip forming with the center edge three sides of a similar hexagon whose center would lie outside the lamination, said laminations being alternately reversed in said bundle, said bundles having corresponding ends fitting together to form butt and lap joints.

4. A three phase magnetic core comprising, in combination, three generally U-shaped bundles of flatwise curved laminations of magnetic strip material, the laminations at the ends of said bundles being staggered lengthwise, two of said bundles being arranged in the same plane with corresponding ends facing each other, the other bundle being in the plane at right angles to the plane of the first two bundles and with its ends facing the sides of the ends of the first two bundles, and butt and lap joints for joining the corresponding ends of all of said bundles.

5. A three phase T yoke core comprising, in combination, three generally U-shaped bundles of nested flatwise curved laminations, two of said bundles being duplicates, said duplicate bundles being arranged in the same plane with their ends facing each other, the ends of the laminations in said duplicate bundles being alternately lengthwise offset from each other to provide alternately extended and recessed ends, the third bundle likewise having the ends of its laminations alternately lengthwise offset from each other to provide alternately extended and recessed ends, the distance between the lengthwise offset ends of the alternate laminations of the third bundle being equal to the width of the laminations of the duplicate bundles, the third bundle being disposed at right angles to the other two with its alternately-extended lamination ends between the ends of the alternately extended laminations of the other two bundles, and magnetic inserts in alternate lamination layers for interconnecting the alternately recessed lamination ends of all three bundles in those layers.

6. A three phase T yoke core comprising, in combination, three generally U-shaped bundles of nested flatwise curved laminations, two of said bundles being duplicates, said duplicate bundles being arranged in the same plane with their ends facing each other, the ends of the laminations in said duplicate bundles being square and alternately lengthwise staggered to provide alternately extended and recessed ends, the third bundle likewise having the ends of its laminations square and alternately lengthwise staggered to provide alternately extended and recessed ends, the distance between the ends of the alternate laminations of the third bundle being equal to the width of the laminations of the duplicate bundles, the third bundle being disposed at right angles to the other two with its alternately extended lamination ends between the ends of the alternately extended laminations of the other two bundles, and rectangular magnetic inserts in alternate lamination layers for interconnecting the alternately recessed lamination ends of all three bundles.

7. A three phase core comprising, in combination, three generally U-shaped bundles of flatwise curved laminations of magnetic strip material, the ends of the laminations in said bundles being uneven, said bundles being arranged with their corresponding ends adjacent to and facing each other, and magnetic inserts interleaved between the uneven ends of the laminations of said bundles.

8. A three phase magnetic core comprising, in combination, three generally U-shaped bundles of flatwise curved laminations of magnetic material having a most favorable magnetic direction, the ends of all the laminations being square cut, the ends of the odd numbered laminations being extended beyond the ends of the even numbered laminations, said bundles being arranged with corresponding ends adjacent each other, and magnetic strip inserts of the same magnetic material inserted between the lamination ends of said bundles to form a solid three phase butt and lap joint.

9. A three phase magnetic core comprising, in combination, three generally U-shaped bundles of nested flatwise curved laminations of magnetic material having a highly favorable magnetic direction parallel to their length, said bundles being symmetrically disposed relatively to each other with their ends facing each other, the ends of the laminations in each bundle being alternately lengthwise offset from each other, and alternately different shaped inserts of the same magnetic material that said laminations consist of interleaved between the ends of the laminations, one set of alternate inserts having two adjacent sides which make butt contact respectively with the ends of corresponding laminations of two of said bundles, the magnetic direction of said last-mentioned inserts being such as to bisect the angle between said two sides.

CECIL G. DUNN.

REFERENCES CITED

The following references are of record in the file of this patent:

UNITED STATES PATENTS

| Number | Name | Date |
|---|---|---|
| 1,390,050 | Lee | Sept. 6, 1921 |
| 2,367,927 | Chubb | Jan. 23, 1945 |